US008126445B2

(12) United States Patent
Kennedy

(10) Patent No.: US 8,126,445 B2
(45) Date of Patent: Feb. 28, 2012

(54) SYSTEM FOR INITIATING GEOSPATIAL FUNCTIONAL CONTROL OF MOBILE ELECTRONICS

(75) Inventor: Michael J. Kennedy, Chicago, IL (US)

(73) Assignee: Leadership Dynamics Corporation, Chicago, IL (US)

( * ) Notice: Subject to any disclaimer, the term of this patent is extended or adjusted under 35 U.S.C. 154(b) by 702 days.

(21) Appl. No.: 11/995,568

(22) PCT Filed: Jul. 17, 2006

(86) PCT No.: PCT/US2006/027589
§ 371 (c)(1),
(2), (4) Date: Jan. 14, 2008

(87) PCT Pub. No.: WO2007/011831
PCT Pub. Date: Jan. 25, 2007

(65) Prior Publication Data
US 2008/0224884 A1    Sep. 18, 2008

(51) Int. Cl.
*H04M 3/00* (2006.01)
(52) U.S. Cl. ...................................... 455/418
(58) Field of Classification Search .... 455/414.1–414.4, 455/403, 418, 419, 422.1, 72, 1, 456, 404.2, 455/410, 411, 412.2, 421, 426.1, 458, 463, 455/465, 41.1–41.3, 12.1, 404, 432, 537, 455/121, 462, 467, 445, 433; 340/825.52
See application file for complete search history.

(56) References Cited

U.S. PATENT DOCUMENTS

| | | | | |
|---|---|---|---|---|
| 5,568,153 A | * | 10/1996 | Beliveau | 342/357.43 |
| 5,678,182 A | * | 10/1997 | Miller et al. | 455/12.1 |
| 5,778,304 A | * | 7/1998 | Grube et al. | 455/456.4 |
| 5,857,155 A | * | 1/1999 | Hill et al. | 455/456.3 |
| 6,011,973 A | * | 1/2000 | Valentine et al. | 455/456.6 |
| 6,038,445 A | * | 3/2000 | Alperovich et al. | 455/432.1 |
| 6,195,529 B1 | | 2/2001 | Linz et al. | |
| 6,230,017 B1 | * | 5/2001 | Andersson et al. | 455/456.6 |
| 6,233,448 B1 | * | 5/2001 | Alperovich et al. | 455/417 |
| 6,314,282 B1 | * | 11/2001 | Weber et al. | 455/404.2 |
| 6,389,288 B1 | * | 5/2002 | Kuwahara et al. | 455/456.6 |
| 6,393,254 B1 | | 5/2002 | Pousada Carballo et al. | |
| 6,456,822 B1 | | 9/2002 | Gofman et al. | |

(Continued)

FOREIGN PATENT DOCUMENTS

WO    WO 2007/011831 A2    2/2007

*Primary Examiner* — Melody Mehrpour

(74) *Attorney, Agent, or Firm* — Baker & McKenzie, LLP; David I. Roche

(57) ABSTRACT

A system for universally controlling the functionality of portable electronic devices in a localized geospatial area is disclosed. A control signal encoded with instructions based on a predetermined protocol is sent from a RF control point transmitter. The encoded signal is received and decoded by portable electronic devices in the area and an action is performed in response to the control signal. Actions can include enabling or disabling a specific function of the portable electronic device, displaying messages on the portable electronic device, or transmitting information from the portable electronic device back to the control point. Actions remain active while in that area or for specified time periods to various levels of precision and reliability through a combination of settings or timing functions. Using portable electronic devices with preprogrammed control groups, the system can also be used to triage communications in emergency situations by restricting the functionality and communications ability of select groups of portable electronic devices.

30 Claims, 6 Drawing Sheets

U.S. PATENT DOCUMENTS

| | | |
|---|---|---|
| 6,496,703 B1 | 12/2002 | da Silva |
| 6,556,819 B2 | 4/2003 | Irvin |
| 6,687,497 B1 | 2/2004 | Parvulescu et al. |
| 6,687,506 B1 | 2/2004 | Girod |
| 6,823,199 B2 | 11/2004 | Gough |
| 6,940,407 B2 * | 9/2005 | Miranda-Knapp et al. ............... 340/572.1 |
| 7,043,286 B1 | 5/2006 | Leason |
| 7,069,027 B2 | 6/2006 | Miriyala |
| 2001/0009863 A1 | 7/2001 | Kim |
| 2002/0086635 A1 | 7/2002 | Tomono |
| 2002/0102968 A1 | 8/2002 | Arend et al. |
| 2003/0143986 A1 * | 7/2003 | Mufti et al. ............... 455/414 |
| 2004/0077339 A1 | 4/2004 | Martens |
| 2004/0102209 A1 * | 5/2004 | Schonwald et al. ....... 455/550.1 |
| 2005/0075117 A1 | 4/2005 | Jang |
| 2005/0107093 A1 | 5/2005 | Dowling |
| 2008/0153429 A1 * | 6/2008 | Johnson et al. ............... 455/72 |

\* cited by examiner

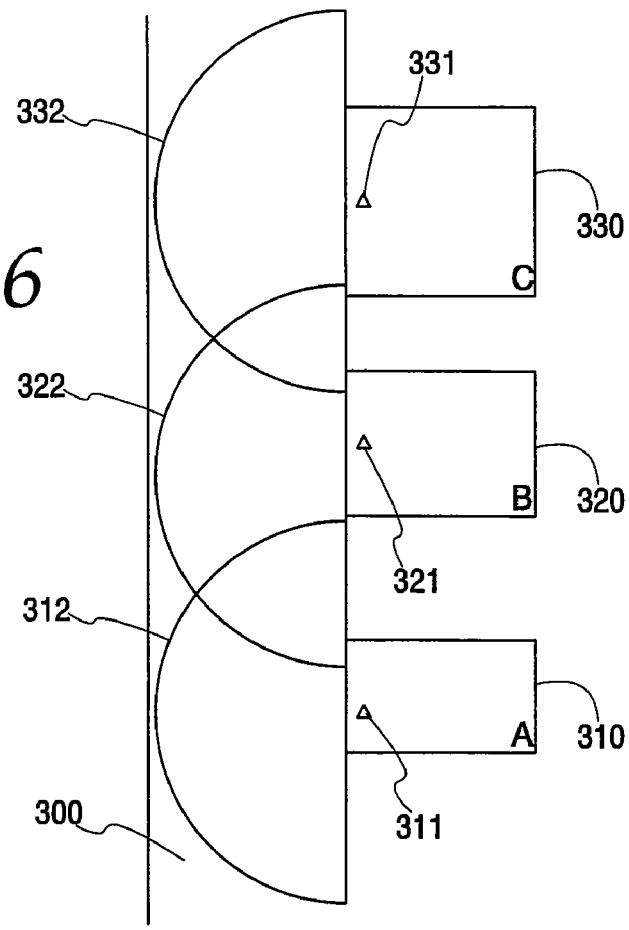
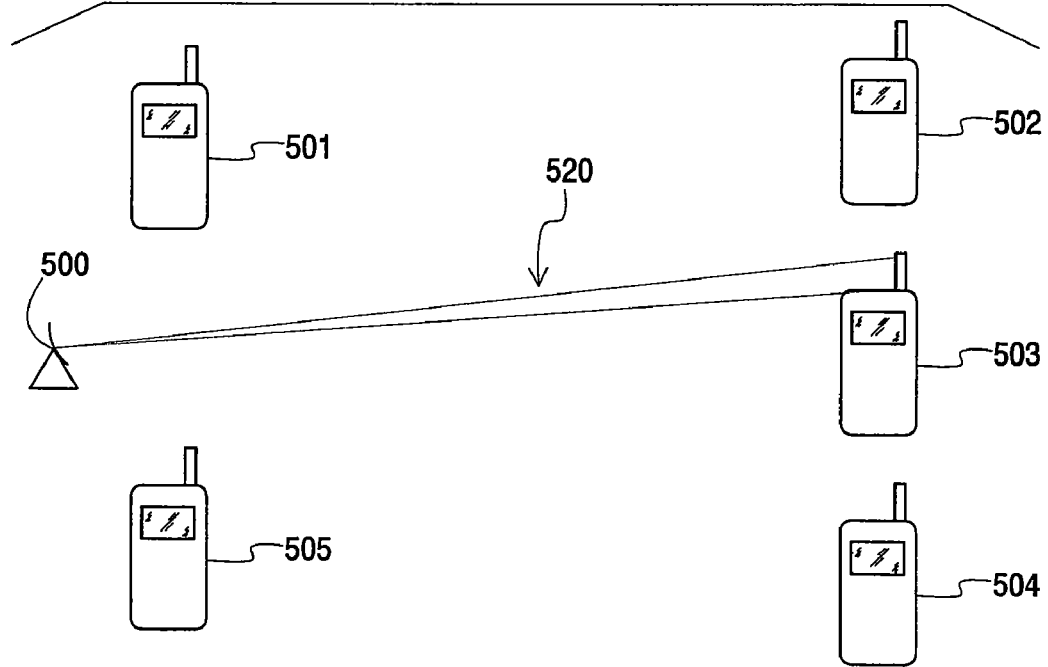

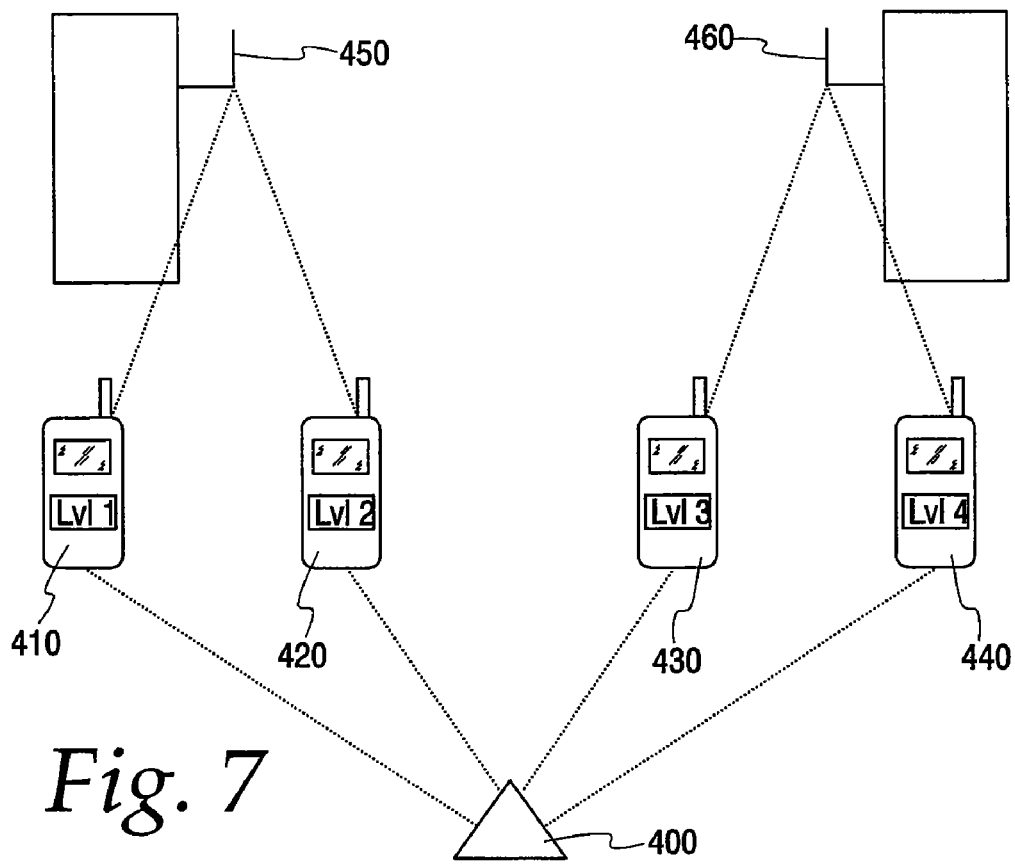

| Tiers | Classification | Communication Access | Display Message |
|---|---|---|---|
| Lvl 1 | Emergency Response | Enabled | Accident at Train Station. All Units Respond |
| Lvl 2 | Reserve Personnel | Enabled | Accident at Train Station. |
| Lvl 3 | Civilian Doctors | Disabled-30 minutes | Accident at Train Station. Casualties Incoming |
| Lvl 4 | General Civilian Populace | Disabled- Indefinitely | There has been an Accident at The Train Station. Non-Priority Communications Disabled. Please use alternate routes. |

SYSTEM FOR INITIATING GEOSPATIAL FUNCTIONAL CONTROL OF MOBILE ELECTRONICS

TECHNICAL FIELD OF THE INVENTION

The invention relates to a software and hardware system that interacts with the functionality of portable electronic devices such as cellular phones and handheld computers in a particular geographical area.

BACKGROUND OF THE INVENTION

Portable electronic devices (PEDs) are a ubiquitous part of modern society. Most notable of this class of device is the cellular telephone, with more than 150 million wireless subscribers in the United States alone and over 750 million users worldwide. In addition to cellular phones, other PEDs such as personal digital assistants (PDAs), handheld computers, handheld electronic games, portable DVD and MP3 players have been inserted into the fabric of everyday life in both recreation and business capacities. In addition to scheduling and record keeping, these devices are typically enabled with wireless network capabilities to facilitate applications such as voice communications, networking with other PEDs, text messaging and email. The high level of dependence on this wireless communications technology brings both convenience as well as a new level of intrusion into public places and situations.

A side effect of their widespread use is that the use of PEDs is disruptive and undesirable in certain settings. For example, it is generally considered a nuisance to use a cellular phone in a setting such as a concert hall, office meeting or classroom. Other venues may discourage or prohibit the use of wireless communication devices for other reasons. The use of cellular phones in some hospitals is prohibited because of concerns for electrical interference with hospital equipment. Likewise, some companies refuse entry to visitors with their camera-enabled handheld phones for fears of corporate espionage. Airplanes prohibit the use of portable electronic devices during takeoff and landing portions of flight due to interference with the ground based network or onboard instruments. Requests by officials to voluntarily turn off the PEDs are not completely effective, as the requests are sometimes intentionally or accidently ignored.

Electronic jamming of radio frequency (RF) signals through mechanisms such as the §0 transmission of an interference signal is known in the art. Other methods, such as those disclosed in U.S. Pat. Nos. 6,496,703 and 6,556,819, operate on the level of the cellular service provider and thus require the provider's infrastructure. A side effect of electronic jamming is that the jamming eliminates wireless functionality altogether and precludes the use of the device for emergency communications. This is undesirable in some situations, such as that of a school environment seeking to balance the need to maintain classroom order by preventing students from text messaging, making phone calls, or playing games during class time, yet respecting the need for a parent to be in contact with their child for emergency purposes or vice versa.

In addition, during times of emergency or crisis, the attendant increased levels of communications strain the ability of wireless networks to handle the increased traffic. Critical communications that would serve the public interest may be hampered by increased traffic of non-priority wireless network traffic. It would be desirable to have a system by which some or all of the features and functions of wireless devices can be selectively enabled or disabled within a local area by controlling functionality at the device level within a geospatial zone. By interfacing with the operating system on PEDs without reliance on cellular carrier networks, complete compliance of communication restrictions can be achieved without human intervention and its potential for error.

Furthermore, a way to distribute localized alerts and information based on geographic parameters aids in crisis management and response. Information can be directed or pushed to wireless communication devices based on geography, providing a modern day "Emergency Broadcasting System" to help authorities efficiently manage crises or other events requiring such communication. Moreover, public officials can triage access to wireless networks in emergency situations to exclude non-essential communications. In addition, it may also be in the interests of governmental authorities to be able to tap into these communication devices to intercept live communications and retrieve information vital to public safety and national security.

In an age of inexpensive PEDs capable of wireless communication such as disposable pre-paid cellular phones, it is becoming increasingly impractical for law enforcement authorities to obtain intelligence on impending crimes. Conventional methods such as wiretapping and searching phone records presuppose that the time required to obtain the necessary information is available or that a phone number to trace phone records is identifiable. With proper legal authority, it would be beneficial for law enforcement to have a system for listening into a wireless phone conversation and obtaining data such as call lists, text message history, and calendars in real time from a PED (e.g., one they observe in the possession of an individual for whom they have authority to investigate) without needing to first obtain the PED's identifying information (e.g., a phone number or IP address).

SUMMARY OF THE INVENTION

The present invention relates to a system for distributing information, controlling network access of and controlling, without the requirement of user intervention, the features of localized PEDs in specific physical locations. The system comprises at least one control point, whether fixed or mobile, containing at least one radio frequency (RF) transmitter. The control point broadcasts a control signal, which is received by a receiver on at least one localized portable electronic device within the range of the control signal. The system further includes a decoder, which may be implemented by hardware, software, or a combination thereof, on the PED that decodes the control signal and executes the functions instructed by the control signal.

In certain embodiments, the wireless communication device also includes a countdown timer. Upon decoding the control signal, the PED executes the requested functions for the period of time as instructed and determined by the control signal. In this manner, the functionality of the device is controlled until the timer expires or a signal establishing a different set of functionality is received from the control point or a signal to return the functionality to its prior state, or a new state, is received from the control point.

A repeated instruction from the control point has the effect of resetting the countdown timer on the portable electronic device. Functionality is automatically restored when the countdown timer expires without being renewed by a control point signal. In this way, when a user leaves the local area where use of a device function is prohibited, the device reverts to full functionality. In addition, only local devices are affected as devices that are outside the range of the control point transmission are unaffected.

The system can also be used to push messages to a PED in the localized broadcast area. For example, emergency broadcast messages can be sent through the system to all portable electronic devices in the local vicinity, causing the devices to display civil authority instructions or information. Commercial messages can also be distributed to local devices in a similar fashion. Yet another use for the system is to create a link between a PED and the control point in order to download data and monitor communications to and from the PED.

BRIEF DESCRIPTION OF THE DRAWINGS

In the drawings:

FIG. 6 is a plan view showing the use of control points to broadcast marketing information to portable electronic devices passing by local storefronts;

FIG. 7 is a schematic showing the use of an alternative embodiment for triaging communications;

FIG. 8 is a chart showing an example of communications triage under an alternative embodiment; and FIG. 9 is a plan view showing the use of an embodiment of the present invention to selectively target one portable electronic device out of a field of many devices.

DETAILED DESCRIPTION OF THE INVENTION

The present invention provides a system by which it is possible to remotely control the functionality of PEDs capable of wireless communication. The system of the present invention includes at least one control point with a transmitter for sending localized control signals. Ideally, the power of the transmitter is selected so that the range of the signal transmission is substantially the same as the local geospatial area where the desired effect is to be achieved. Multiple transmitters with overlapping signal ranges can be used to cover areas larger than the range of a single transmitter.

The control signal is received by at least one PED with a receiver in the locality of the control point that is capable of wireless communication. Devices which are not natively equipped for wireless communication (e.g., portable DVD players or some handheld game consoles) can be so enabled by the addition of a receiver component suitably adapted for the particular device. The PED also includes a decoder which includes hardware, software, or a combination of the two to permit the PED to interpret the control signals sent by the control point transmitter. For universal functionality, it is desirable that the software protocol be standardized so that all PEDs react similarly to the same control signal instructions. A preset series of software protocol codes can be used so that receivers can associate certain signals as corresponding to certain instructions (e.g., disable Short Message Service (SMS) functions, turn device off, disable cameras, provide electronic messages, etc.). Ideally, the receiver is adapted to the appropriate class of device and can ignore irrelevant instructions. For example, a portable DVD player's receiver ideally will ignore a "mute ringer" signal intended for cellular telephones, while the cell phone receiver as well as the portable DVD player receiver will both respond to the same command to power down.

While the following discussion of the preferred embodiments is in the context of a cellular telephone and its associated functionality, it should be understood that the system described can similarly be adapted to work with other PEDs such as handheld organizers, portable computers and handheld gaming devices and functions associated with these PEDs.

Figure 1:
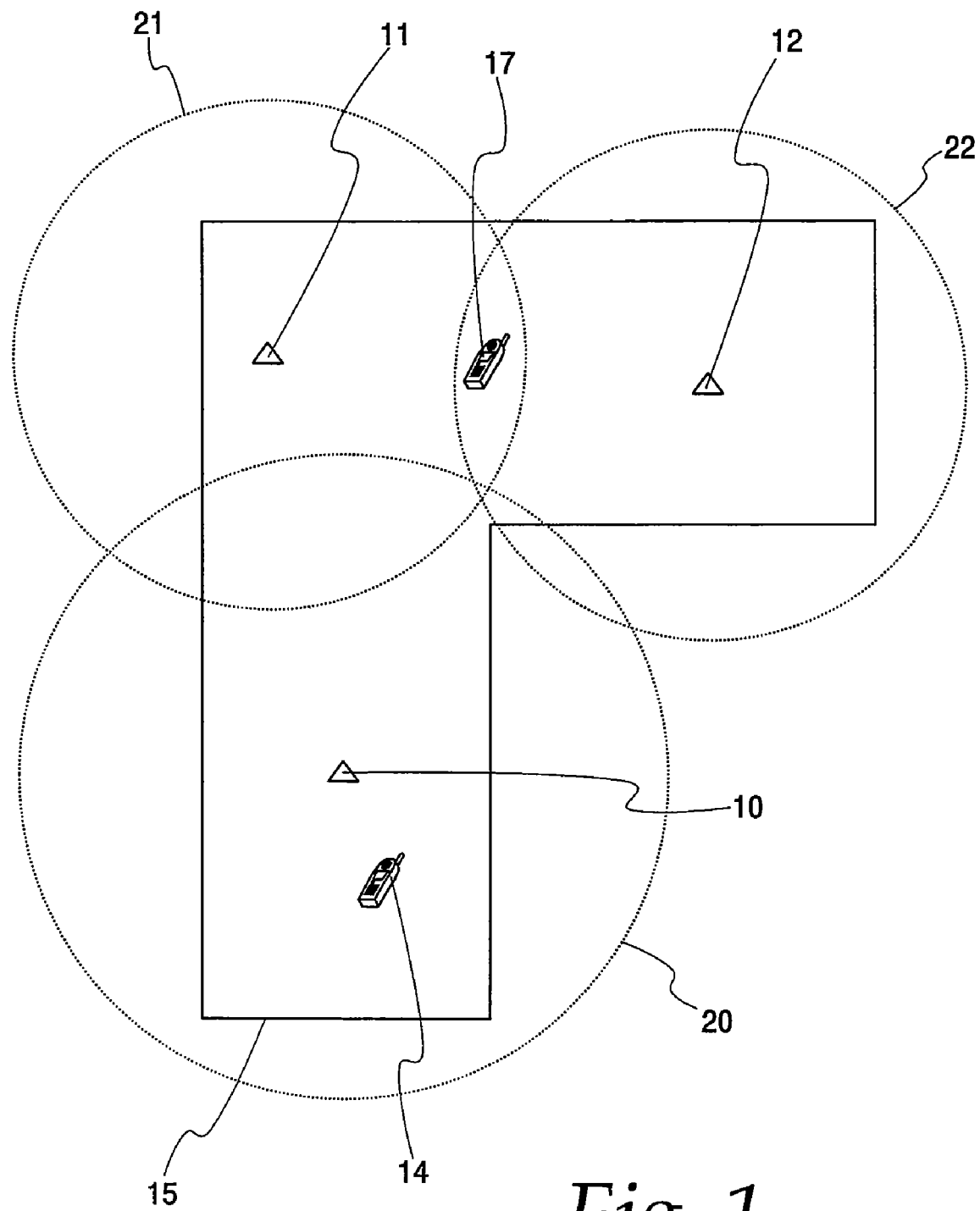
FIG. 1 is a plan view showing the deployment of three control points on a factory floor and the overlapping signal ranges in one preferred embodiment.

One use of the system is to selectively enable or disable the functionality of the PED within a local geospatial area. In one embodiment, illustrated in FIG. 1, the system is deployed on a factory floor to prevent opportunities for corporate espionage and to protect trade secrets by temporarily disabling the functionality of the on-board camera found on cellular phones. One or more control points 10, 11 and 12 are located within the factory floor space 15 so that the range of the control signals from the control points would be sufficient to cover the space. The signals for these control points may overlap, if necessary, in order to cover the space to be protected. While in FIG. 1 the control point signal ranges 20, 21 and 23 are radially symmetrical, it will be understood by one skilled in the art that in reality the determination of RF signal ranges varies based on local obstructions and that an electromagnetic signal at the edge of its range varies in strength. It may thus be desirable to situate multiple control points in a manner to avoid any dead spots.

The control point transmitters are set to continually, or at sufficiently short predetermined intervals, broadcast a predetermined control signal instructing local PEDs to disable camera functions. A PED at location 14 receives the control signal from control point 10, while a PED at location 17 can receive control signals from either control point 11 or control point 12. Note that control points with overlapping ranges need not necessarily broadcast the same instructions. For example, it may be desirable for one control point to disable camera functions while another control point broadcasts a signal to set phones to mute the ringer. A cellular phone within the overlapping range of both these signals will respond to both to achieve a combination effect.

A signal to disable all camera features sent by a control point is decoded by the PED. In response to this control signal, software within a cellular phone with camera functions disables camera functionality until it is reactivated by the user. If a user attempts to reactivate the camera function of the cellular phone while remaining within the signal range of any of the control points, the camera functions will be disabled again immediately in response to the control signal broadcast.

In another embodiment, it may be desirable to disable camera functionality only when the camera phone is present on the factory floor but reenable camera functionality without user intervention when the device leaves the factory floor. To accomplish this, the control points can be set to broadcast a signal every X seconds instructing local PEDs to disable camera functions for Y seconds. Upon receipt of this control signal, a camera phone disables the camera functions and initiates the countdown timer to decrement at Y seconds. When the countdown has expired, the phone software automatically without user intervention reenables the camera functions. If prior to the expiration of the countdown timer the camera phone receives another control signal, the camera phone will continue to disable the already disabled camera functions and reset the countdown timer to Y seconds.

Figure 2:
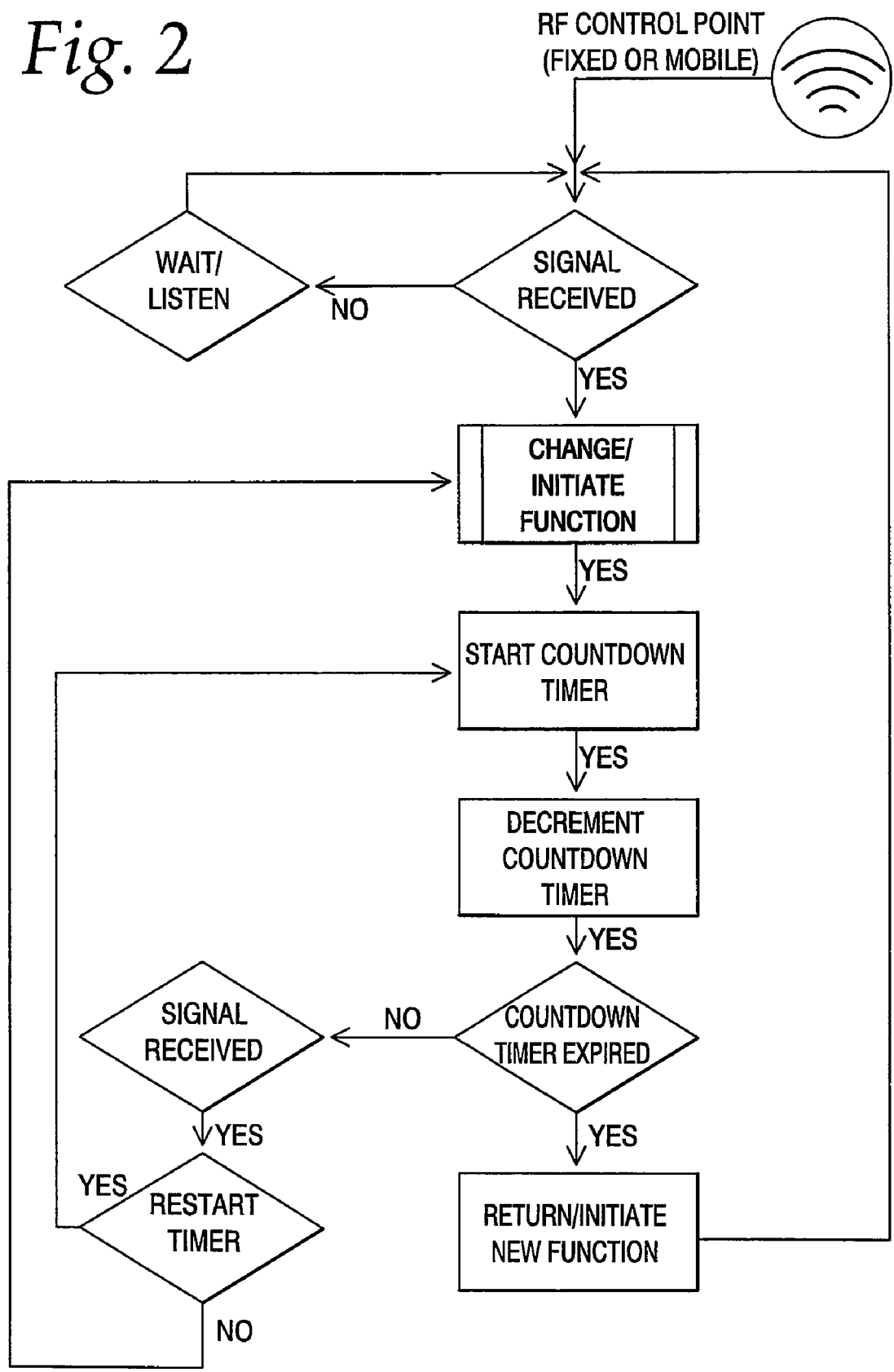
FIG. 2 is a flowchart illustrating the logic of changing the functional set on a portable electronic device according to the present invention.

The logical flowchart of this time limited disablement process is shown in FIG. 2. A PED is periodically at short intervals listening and waiting for control signals at all times. Upon receipt of a control signal, the PED decodes the signal and processes the instruction contained in the signal. Based on the instruction in the signal, the PED changes an aspect of its function, such as disabling or enabling power, audible tones, text messaging, camera, the displaying of certain text, audio, or video messages, or other functionality. The PED then begins a countdown timer. When the timer expires, the altered functionality is restored to the PED. This has the benefit of automating the functionality change of the PED. For example, if the audible ring tone feature of a cellular phone was disabled for one hour, upon the expiration of that hour, audible ring tones would be automatically reenabled by the PED upon expiration of the timer.

While the countdown timer is active, new control signals can still be processed by the PED. A new control signal directing the changing of a different functional feature is processed as previously described, preferably with a separate timer to control the expiration of the new functional state change. If a control signal is received that calls for the same functional state change as already processed, the countdown timer controlling that functional state change will restart with the new timing specified in the control signal.

Figure 3A:
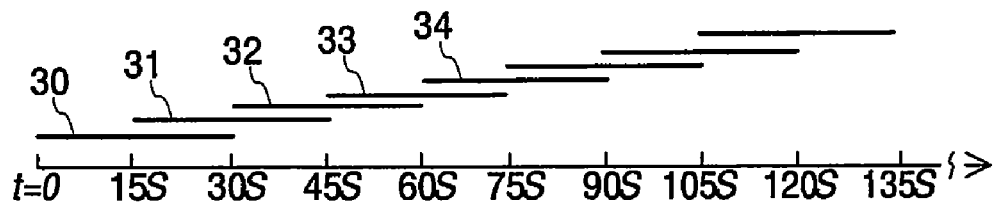
FIG. 3a is a time line showing the effect of subsequent periodic control signals on the countdown timer of a portable electronic device.
Figure 3B:
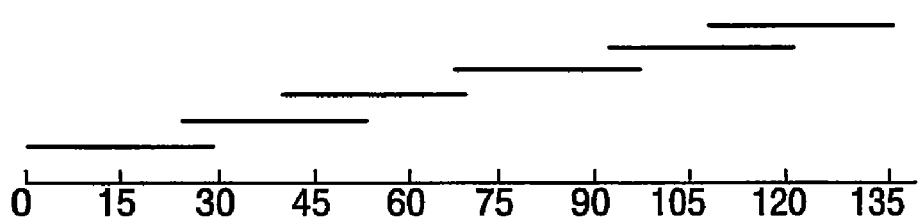
FIG. 3b is a time line showing the effect of subsequent nonperiodic control signals on the countdown timer of a portable electronic device.

FIG. 3a illustrates this situation for a control point broadcasting every 15 seconds (X=15) to disable functionality on a PED for 30 seconds (Y=30). At t=0, the control point sets the countdown timer and disables the functionality on the PED for 30 seconds, represented by time period 30. At t=15s, the control point broadcasts a signal again, causing the PED to reset its timer for another 30 seconds, now to expire at t=45s as shown by time period 31. At t=30s, 45s and 60s, the control point similarly resets the PED countdown timer to correspond to time period 32, 33 and 34. The control signal need not be broadcast on a periodic basis, as shown in FIG. 3b.

In order to continuously disable camera phone functionality on the factory floor, it will thus be apparent that the control signal continuously broadcast interval X should be less than the countdown interval Y so that the countdown timers are reset before they expire. It should also be noted that in order to minimize the window of time where camera functionality is enabled because a camera phone entered into a control point signal range between control signals during interval X, interval X should be small, essentially continuous from a functional perspective. For example, this will also enhance system reliability by having Y>2X as two signal opportunities will be provided. In order to prevent a user from manually reactivating the disabled camera features, the software protocol may optionally lock the user out from manual reactivation until the countdown expires.

In view of the countdown timer, even if the camera phone leaves the signal range of the control points on the factory floor, camera phone functionality will remain disabled. In situations where it is desirable that the disabled features are quickly reactivated after leaving the designated zone, interval Y may be set to a suitably short time frame to minimize the waiting time for the countdown expiration. Similarly, in situations where it is desirable to avoid circumvention of the prohibitions by quickly leaving the zone, interval Y may be set for a longer time frame. As an example, it may be desirable to enforce a no telephone call ban at an academic testing center and avoid circumvention of this ban by disabling cellular phone voice communications for 15 minutes so that students cannot circumvent the prohibition by stepping slightly out of range to make a quick call.

It will be apparent that so long as the phone stays within reception range of the repeating control signal, the camera function will stay disabled. When the phone is moved out of range of the control signal, the camera phone functionality will revert to normal operation once the countdown timer expires without being renewed. This has the added benefit that the disabled functionality of the PED is passively and automatically reenabled without intervention of a user.

It should be appreciated that the same effect can be achieved using different timing schemes. As an illustration, movie theaters discourage patrons from having their cellular phones ring during a screening as it is disruptive to other guests. It would be desirable to force cellular phones to mute or vibrate so that patrons can still discreetly receive urgent calls without disturbing other customers. A continually repeated control signal can be used to perpetually force phones into a mute/vibrate mode as described above.

Figure 4A:
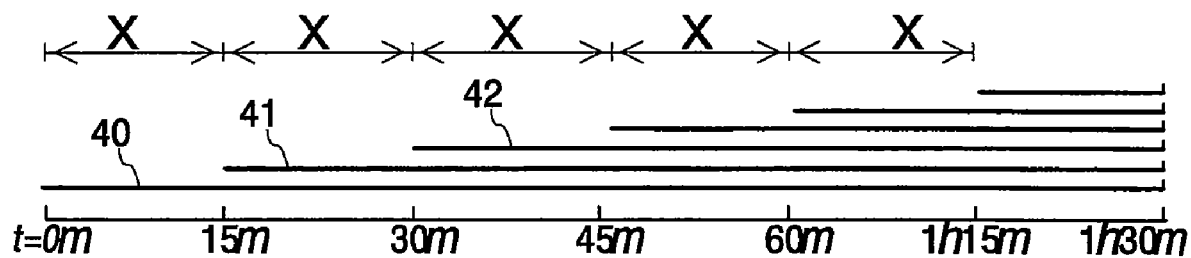
FIG. 4a is a time line showing the effect of subsequent periodic control signals on the countdown timer in a different implementation of an alternative embodiment.

Alternatively, the control signal can itself decrement the control time, as illustrated in FIG. 4a. A control point can broadcast a signal to turn a cellular phone to vibrate mode at the beginning of a movie (t=0) with a timer set for one hour and thirty minutes, the duration of the movie. PEDs in local range of the signal would be put into vibrate mode and active the countdown timer of the device for an hour and thirty minutes, the duration denoted as 40. Fifteen minutes later, at t=15, the control signal would again broadcast the signal, this time with a time setting for one hour and fifteen minutes. The receiving PEDs would then reset their countdown timers to one hour and fifteen minutes, represented by duration 41. For devices that had already received the signal at t=0, the countdown timer was already set to expire at t=1 h 30 m. However, this second signal would command devices that came into range after the initial control signal. At 30 minutes, the control point would broadcast another control signal corresponding to duration 42, setting the timer to expire in one hour. Similarly, subsequent repeats of the control signal will include decrement of the countdown timer by the interval X (in this case X=15 minutes) so that all signals call for the same end time at X=1 hour and 30 minutes.

Figure 4B:
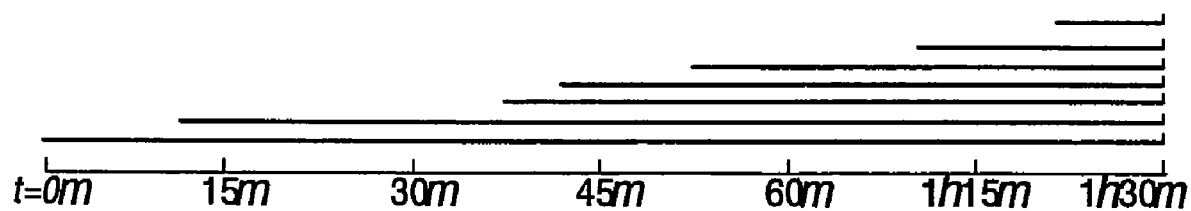
FIG. 4b is a time line showing the effect of subsequent nonperiodic control signals on the countdown timer in a different implementation of an alternative embodiment.

Thus, once again, the system has adjustable precision and reliability. Broadcast of the control thus need not be periodic, as shown in FIG. 4b. Every minute, for example, the continuous broadcast timer setting would be decremented by a minute. It should be noted that this timing scheme has the benefit that the disabled function remains disabled until the specified time even when the device has left the range of the control signal. If this is not desired, a signal outside the theater can be set to continuously broadcast a control signal instructing the PEDs to revert to normal ringer function.

To provide yet another illustrative setting, the use of cellular phones by students at school is disruptive to the classroom. It is thus desirable for the school to limit the ability of students to use their cellular phones but permit the phones to retain some features such as dialing and receiving calls from preauthorized numbers in the event of an emergency. Preauthorized numbers can be preprogrammed into the cellular phone memory by a parent or guardian, similar to parental controls on currently available devices such as satellite and cable television control boxes, etc. In operation, a control point at the school broadcasts a signal to all local devices to enter into an "authorized use only" mode. Upon receiving the command signal, cellular phones in the local area respond to the signal by entering a mode for a predetermined time wherein the phone accepts calls to and from a preprogrammed and preauthorized list of phone numbers. Since the command signal is continuously rebroadcast, the timer disabling this mode is continuously being reset until the phone leaves the vicinity of the control point. If the timer is set for a long enough period, such as for example ten minutes, the timing feature prevents students from leaving school grounds temporarily to escape calling restrictions.

In yet another alternative embodiment, the system can be used to push messages to local PEDs for display in text, graphic, audio or video modes. A control signal sent from a control point instructs receiving PEDs to display a message corresponding to the desired encoded message. These messages can be sent by authorized users such as civil authorities to disseminate emergency information, with the advantage that any compatible device within the localized area can receive targeted information for that area. Furthermore, unlike SMS broadcast lists, the information is received only by devices in the vicinity, requires no coordination between cellular service providers, does not rely on their infrastructure, and can even be transmitted by mobile control points such as one transported by a police cruiser.

Figure 5:
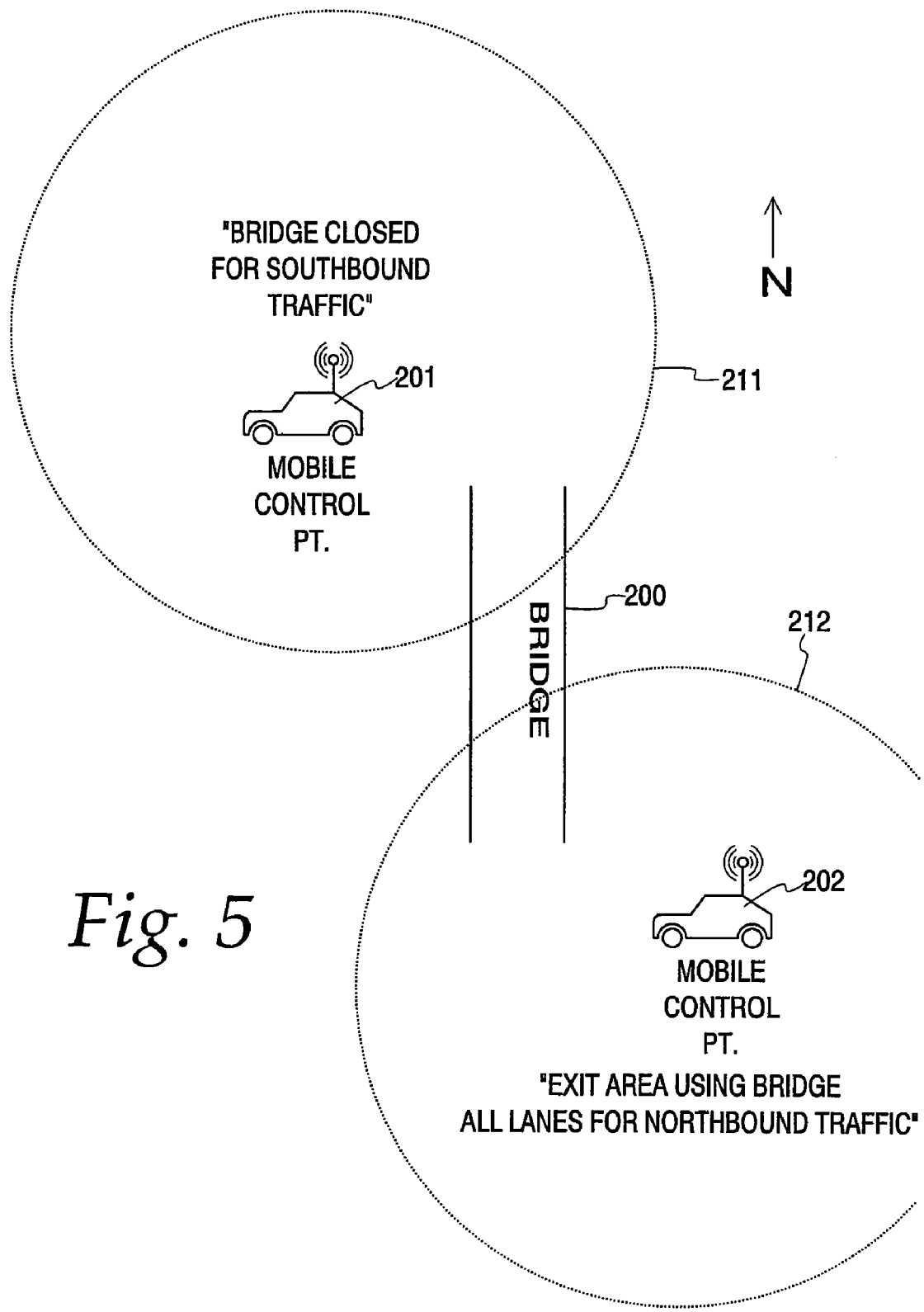
FIG. 5 is a plan view showing the use of an alternative embodiment to broadcast traffic information.

FIG. 5 illustrates an example of how this embodiment can be used to announce a temporary closure of a north-south bridge 200 to all southbound traffic. A mobile control point 201 north of the bridge closed to southbound traffic broadcasts a control signal to devices in the local area. Local PEDs receiving the signal within signal range 211 then display a preset message, in this case a traffic advisory reading for example "Bridge closed for southbound traffic." Similarly, a mobile control point 202 on the south end of the bridge can broadcast a signal that causes the message "All lanes open for northbound traffic" to appear on local PEDs within signal range 212. The system can be similarly used by civil authorities to issue weather advisories such as tornado watches or severe storm warnings. In conjunction with the timer functions discussed above, these advisories can be rebroadcast until the specified expiration time for the advisory.

One benefit of using the system of this embodiment to distribute messages is that by using a universal control point and decoder system on PEDs, civil authorities can be assured that the advisories are reliably and efficiently distributed and received to every PED within signal range. This is in stark contrast to conventional systems, where a thorough distribution of information is impractical since in order to reach or send SMS messages to every wireless communication device in the vicinity, authorities would need to first compile a list of the phone numbers, email addresses of handheld organizers, and other address identification information of PEDs before a message can even be sent. Moreover, conventional systems require that authorities then coordinate with the numerous cellular service providers and wireless network access providers to send a signal to those PEDs. Since a system such as that disclosed in this embodiment is universal to PEDs and functions by active broadcast that is unaddressed to any particular PED, the collection of addressing information and coordination between cellular and wireless network providers is unnecessary.

Low power transmitters can also be used commercially to broadcast advertisements to passing devices. As shown in FIG. 6, storefronts 310, 320 and 330 are adjacent to sidewalk 300. In order to attract the attention of a potential customer potentially passing by, each storefront has a control point transmitter 311, 321 and 331, respectively, projecting low power signals covering the areas represented by 312, 322 and 332, respectively. As a customer passes through the area of coverage 312, the control signal pushes a command to the receiving device to display a marketing message for storefront 310. As the customer moves down the sidewalk 300 to within area 322, the customer's device displays a marketing message for store 320.

Low powered transmitters can also be used to pass on messages in other settings. In environments with long lines, such as at public attractions or amusement parks, the system can be used to push a message for display on local PEDs of patrons waiting in line to display the estimated wait time. Similarly, at construction sites, a message reminder can be continuously sent warning persons that they are now in a construction zone and that protective helmets are required.

A further embodiment of the system can be used to control access of PEDs to manage the use of communication bandwidth. In emergency situations, wireless communications are heavily used by emergency personnel to coordinate disaster management and relief efforts. These same wireless communication channels are simultaneously swamped by regular civilians calling to let others know that they are safe. These calls, while of utmost urgency to those making them, are generally considered lower priority on a larger scale since it is often the case that priority emergency personnel communications cannot be completed because these civilian calls overwhelm the limited bandwidth in the communications system. It is desirable to thus triage the ability of PEDs to communicate during crisis situations, disabling non-priority PEDs such as civilian cell phones while maintaining and enabling priority PED communications to pre-authorized users such as a doctor's pager.

FIG. 7 illustrates the use of this alternate embodiment to triage communications. In this embodiment, PEDs 410, 420, 430 and 440 are within the vicinity of control point 400. The control point 400 operates independently of cellular service provider towers 450 and 460. PED 410 represents a PED assigned to emergency services, PED 420 represents a PED assigned to on-call reserve personnel, while PEDs 430 and 440 represent civilian non-priority PEDs. The PEDs are preprogrammed with a priority level. A number of different levels may be present in any given priority scheme.

In routine operation, PEDs 410, 420, 430 and 440 operate normally through their normal cellular service provider towers. During a time of crisis, control point 400, which may be pre-sited and fixed in the crisis area or brought in as a mobile control point, is activated and broadcasts a control signal disabling non-priority PEDs. In view of the preprogrammed triage priority, the different PEDs react differently to the control signal. In order to triage communications and prioritize emergency services calls, the control signal may enable PED 410 while disabling lower priority PEDs 420, 430 and 440. This has the effect of permitting PED 410 to operate normally while forcing the lower priority PEDs off the network and preserving communications bandwidth for critical functions. The control signal can also be used to carry messages. This same triaging scheme can be used to push different messages to predetermined groups. This ensures that each group receives the appropriate information required by the circumstances.

FIG. 8 illustrates the operation of the system in a hypothetical emergency scenario involving mass casualties at a train station. In order to triage communications, civil authorities deploy control point 400 to shut down non-essential PEDs and preserve bandwidth for vital communications for emergency response teams. A civil authority operator transmits a control signal with different instructions to each triage priority level, in this case four. PED 410, assigned to emergency services, is instructed to turn on, remain enabled, and display a message notifying emergency response crews of the nature of the emergency and to respond to the location. PED 420, preprogrammed with priority level two, is instructed to enable communication features and display a message that there is an accident at the train station. PED 430, corresponding to a third priority level assigned to PEDs held by civilian doctors, is disabled from voice communications for thirty minutes and instructed to display a message to prepare for incoming casualties. Finally, level four PED 440, corresponding to a PED owned by a general civilian, is remotely instructed by the control signal to disable all communication features and display a message informing the holder of the accident and advising the use of alternate routes. Note that level four priority need not necessarily be preprogrammed and can represent the class of PEDs that were not given preprogrammed instructions.

It will be noted that the system described above has the benefit of flexibility and rapid response. Since all PEDs are preprogrammed to respond to a universal control signal protocol, the use of mobile control point 400 to triage communications is an efficient mechanism for rapidly disseminating information. This system also has the benefit of being independent of and overriding control from conventional wireless access points and cellular service providers, obviating the need to coordinate among the different cellular service provider companies to distribute vital communications. The triage is also limited to the local geospatial vicinity of the control point and does not require knowing addressing information such as electronic addresses or phone numbers for PEDs in the local vicinity. By re-broadcasting the control signal in subsequent intervals, PEDs that enter the area subsequent to the first broadcast can also be triaged.

By adjusting the power of the transmitter in a control point and focusing the signal into specific directions, the system can be used to target and interact with specific PEDs. FIG. 9 shows a directional control point transmitter 500 in an environment with five PEDs 501, 502, 503, 504 and 505. Control point transmitter 500 is capable of directing a RF control signal as a narrow beam 520 through means such as a parabolic reflector, directional antenna or other beam focusing mechanisms. FIG. 9 illustrates the use of the directional control point 500 and a directional control signal 520 to specifically target PED 503 out of the environment of five PEDs.

The ability to specifically target a specific PED gives rise to a host of abilities not present with an omni-directional or area control signal broadcast. For example, in order to obtain a call history of a cellular phone or tap into a live conversation, a law enforcement official generally needs to have the phone number of the cellular phone in question and the cooperation of the cellular service provider to obtain the call history of the phone and monitor conversations. Moreover, without physical custody of the phone in question, it is difficult if not impossible to retrieve other data from the phone in question, such as calendar entries and memo notes entered into the phone. With the rise of inexpensive disposable prepaid telephones, it is not always possible for a law enforcement official to obtain the number of a cellular phone. In addition, securing the cooperation of the cellular service provider takes time, at which point the phone may have been discarded.

In this embodiment, a directional control point 500 broadcasts a focused directional beam 520 capable of being targeted at a desired PED, in this case PED 503. A control signal is broadcast instructing the PED to open an audio link so that voice communications through PED 503 can be monitored at control point 500. In addition, the control signal can instruct PED 503 to send information such as call history, text messages and organizer entries. It is important to note that this method has an advantage in that retrieval permits real-time interception of voice communications without the need to obtain addressing information on the PED or the cooperation of a cellular service provider. Since the system is universal to receiver equipped PEDs, this system can be used to retrieve entries and information off personal organizers such as PDAs that cannot typically be remotely retrieved through conventional means.

In a commercial context, directional control points can be combined with low power transmitters to interact with a customer's PED. The PED can be used as an electronic pocketbook. A low power directional transmitter is positioned at a cashier's station. After the purchases have been totaled, the customer can use the PED to pay for the transaction. The transmitter at the cashier's station broadcasts a control signal to the PED, which transmits payment information or authorization to add the charge to the PED account (e.g., cellular phone bill) or a linked credit card in response. Payment is then processed through normal channels.

While various descriptions of the present invention are described above, it should be understood that the various features can be used singly or in combination. Therefore, this invention is not limited to the specific preferred embodiments described herein. Further, it should be understood that variations and modifications within the spirit and scope of the invention may occur to those skilled in the art to which the invention pertains and are included as further embodiments of the present invention.

The invention claimed is:

1. A method for remotely controlling the functionality of local portable electronic devices, including cellular telephones, comprising:
 providing at least one control point with a radio frequency transmitter;
 broadcasting a localized control signal from the transmitter, the signal not being addressed to a unique portable electronic device, the signal further being encoded with an instruction to induce a portable electronic device to perform a function in response to the signal, the signal being broadcasted at a first time interval;
 receiving and decoding the signal by a portable electronic device; and
 performing the function specified in the signal by the portable electronic device in response to the signal, the function being executed for a second time interval, wherein the first time interval is based at least in part on the second time interval.

2. The method of claim 1, wherein the signal further includes an instruction that the function to be executed by the portable electronic device be performed for the second time interval as specified by the signal.

3. The method of claim 2, wherein the timing function associated with the second time interval is reset by receipt of a new signal.

4. The method of claim 1, wherein the encoded instructions direct the portable electronic device to power off in response to the signal.

5. The method of claim 1, wherein the encoded instructions direct the portable electronic device to switch its sound generation mode to either off, vibrate, or to other audio modes available on the portable electronic device.

6. The method of claim 1, wherein the encoded instructions direct the portable electronic device to disable the acquisition of optical data.

7. The method of claim 1, wherein the encoded instructions direct the portable electronic device to disable the acquisition of audio data.

8. The method of claim 1, wherein the encoded instructions direct the portable electronic device to disable features and programs on the portable electronic device.

9. The method of claim 1, wherein the encoded instructions direct the portable electronic device to disable reception of other wireless signals by the portable electronic device.

10. The method of claim 1, wherein the encoded instructions direct the portable electronic device to display the text, video, audio, or audiovisual signal encoded in the signal.

11. The method of claim 10, wherein the encoded instructions request the user of the portable electronic device to respond to the signal.

12. The method of claim 10, wherein the encoded instructions require the user of the portable electronic device to respond to the signal.

13. The method of claim 1, wherein the encoded instructions direct the portable electronic device to transmit information and data to the control point in response to the control signal.

14. The method of claim 1, wherein the signal contains a code identifying a predetermined group of portable electronic devices to respond to the signal.

15. The method of claim 14, wherein the portable electronic device performs the function only if the portable electronic device falls within the predetermined group identified by the code.

16. A method for remotely controlling the functionality of local portable electronic devices, including cellular telephones, comprising:
   providing at least one control point with a radio frequency transmitter;
   broadcasting a localized control signal from the transmitter, the signal not being addressed to a unique portable electronic device, the signal further being encoded with an instruction to induce a portable electronic device to perform a function in response to the signal, the signal being broadcasted at a first time interval;
   receiving and decoding the signal by a portable electronic device; and
   performing the function specified in the signal by the portable electronic device in response to the signal, the function being executed for a second time interval, wherein the first time interval is adjusted at least in part on the first time interval.

17. The method of claim 16, wherein the signal further includes an instruction that the function to be executed by the portable electronic device be performed for the second time interval as specified by the signal.

18. The method of claim 17, wherein the timing function is reset by receipt of a new signal.

19. The method of any one of claims 16 through 18, wherein the encoded instructions direct the portable electronic device to power off in response to the signal.

20. The method of any one of claims 16 through 18, wherein the encoded instructions direct the portable electronic device to switch its sound generation mode to either off, vibrate, or to other audio modes available on the portable electronic device.

21. The method of any one of claims 16 through 18, wherein the encoded instructions direct the portable electronic device to disable the acquisition of optical data.

22. The method of any one of claims 16 through 18, wherein the encoded instructions direct the portable electronic device to disable the acquisition of audio data.

23. The method of any one of claims 16 through 18, wherein the encoded instructions direct the portable electronic device to disable features and programs on the portable electronic device.

24. The method of any one of claims 16 through 18, wherein the encoded instructions direct the portable electronic device to disable reception of other wireless signals by the portable electronic device.

25. The method of any one of claims 16 through 18, wherein the encoded instructions direct the portable electronic device to display the text, video, audio, or audiovisual signal encoded in the signal.

26. The method of claim 25, wherein the encoded instructions request the user of the portable electronic device to respond to the signal.

27. The method of claim 25, wherein the encoded instructions require the user of the portable electronic device to respond to the signal.

28. The method of any one of claims 16 through 18 or 26, wherein the encoded instructions direct the portable electronic device to transmit information and data to the control point in response to the control signal.

29. The method of any one of claims 16 through 18, wherein the signal contains a code identifying a predetermined group of portable electronic devices to respond to the signal.

30. The method of claim 28, wherein the portable electronic device performs the function only if the portable electronic device falls within the predetermined group identified by the code.

* * * * *